US012782641B2

(12) United States Patent
Sakurai

(10) Patent No.: US 12,782,641 B2
(45) Date of Patent: Nov. 3, 2026

(54) OPTICAL SWITCH WITH CORES OF A MULTI-CORE FIBER AT A CERTAIN PATTERN AND PITCH ALIGNED WITH DUAL-AXIS MIRRORS OF MAGNIFIED SAME PATTERN AND PITCH

(71) Applicant: SANTEC HOLDINGS CORPORATION, Aichi (JP)

(72) Inventor: Yasuki Sakurai, Aichi (JP)

(73) Assignee: SANTEC HOLDINGS CORPORATION, Aichi (JP)

( * ) Notice: Subject to any disclaimer, the term of this patent is extended or adjusted under 35 U.S.C. 154(b) by 286 days.

(21) Appl. No.: 18/832,743

(22) PCT Filed: Mar. 29, 2023

(86) PCT No.: PCT/JP2023/012997
§ 371 (c)(1),
(2) Date: Jul. 24, 2024

(87) PCT Pub. No.: WO2024/201848
PCT Pub. Date: Oct. 3, 2024

(65) Prior Publication Data

US 2026/0243966 A1 Aug. 20, 2026

(51) Int. Cl.
*G02B 6/35* (2006.01)
*G02B 6/32* (2006.01)

(52) U.S. Cl.
CPC ............... *G02B 6/357* (2013.01); *G02B 6/32* (2013.01)

(58) Field of Classification Search
CPC .................................. G02B 6/357; G02B 6/32
See application file for complete search history.

(56) References Cited

U.S. PATENT DOCUMENTS 9,182,601 B2 * 11/2015 Inoue ................. G02B 6/29311
11,516,562 B2 * 11/2022 Jinno ................. G02B 26/0833
(Continued)

FOREIGN PATENT DOCUMENTS

CN 111596412 A 8/2020
CN 114167550 A 3/2022
(Continued)

OTHER PUBLICATIONS

Masahiko Jinno, "Core Selective Swith With Low Insertion Loss Over Ultra-Wide Wavelength Range for Spatial Channel Networks," Journal of Lightwave Technology, vol. 40, No. 6, Mar. 15, 2022.

(Continued)

*Primary Examiner* — Andrew Jordan
(74) *Attorney, Agent, or Firm* — Meunier Carlin & Curfman LLC

(57) ABSTRACT

An optical switch includes a connector, a lens, and a reflective mirror array. The lens is arranged so that input lights from one or more multi-core fibers coupled to the connector pass through the lens. The reflective mirror array is configured to reflect each of the input lights that propagate through the lens toward an output destination. Each of the one or more multi-core fibers includes multiple cores arranged in a two-dimensional array at a specific pitch so as to form a specific geometric pattern. The reflective mirror array includes multiple reflective mirrors arranged in a two-dimensional array at a magnified geometric pattern and pitch. Each of the multiple reflective mirrors is configured to rotate a reflection surface around two rotation axes.

14 Claims, 8 Drawing Sheets

(56) References Cited

U.S. PATENT DOCUMENTS

| | | | | |
|---|---|---|---|---|
| 11,525,960 | B2 * | 12/2022 | Shimakawa | G02B 6/3518 |
| 12,659,067 | B2 * | 6/2026 | Kawai | H04J 14/04 |
| 2002/0109076 | A1 * | 8/2002 | Tochio | G02B 26/0841 250/214 SW |
| 2002/0164114 | A1 * | 11/2002 | Golub | G02B 6/356 356/330 |
| 2003/0190113 | A1 * | 10/2003 | Huang | G02B 6/3586 385/18 |
| 2003/0218793 | A1 | 11/2003 | Soneda | |
| 2012/0328238 | A1 * | 12/2012 | Inoue | G02B 6/32 385/33 |
| 2015/0260920 | A1 * | 9/2015 | Ohtsuka | G02B 6/3556 385/16 |
| 2016/0170202 | A1 | 6/2016 | Yasuda | |
| 2016/0286288 | A1 * | 9/2016 | Suzuki | H04Q 11/0005 |
| 2018/0063607 | A1 * | 3/2018 | Xia | H04B 10/2581 |
| 2018/0180872 | A1 | 6/2018 | Hopkins | |
| 2018/0278359 | A1 * | 9/2018 | Robertson | H04Q 11/0005 |
| 2022/0182741 | A1 | 6/2022 | Jinno | |

FOREIGN PATENT DOCUMENTS

| | | | |
|---|---|---|---|
| JP | 2003344785 | A | 12/2003 |
| JP | 2004109446 | A | 4/2004 |
| JP | 2011137961 | A | 7/2011 |
| JP | 2016110008 | A | 6/2016 |
| WO | 2020174919 | A1 | 9/2020 |

OTHER PUBLICATIONS

International Search Report for Application No. PCT/JP2023/012997.

Japanese Office Action for 2024-501188 dated Nov. 19, 2024.

Japanese office Action for Application 2024-501188 dated Feb. 18, 2025.

IPRP issued in PCT/JP2023/012997 dated Oct. 9, 2025.

* cited by examiner

OPTICAL SWITCH WITH CORES OF A MULTI-CORE FIBER AT A CERTAIN PATTERN AND PITCH ALIGNED WITH DUAL-AXIS MIRRORS OF MAGNIFIED SAME PATTERN AND PITCH

TECHNICAL FIELD

The present disclosure relates to an optical switch.

BACKGROUND ART

Along with an increase in speed of mobile communication, a communication traffic of a backbone optical network continues to increase in recent years. With the present optical link using a single-mode fiber (SCF), it is difficult to continuously meet the increasing traffic demand. Therefore, a space division multiplexing (SDM) network that uses a multi-mode fiber (MCF) has been proposed.

The SDM network comprises a SDM layer that uses channel routing by MCF-based space division, in addition to a wavelength division multiplexing (WDM) layer that uses the SCF. Recently, as a space cross-connect (SXC) architecture that uses the MCF, a simple and economically efficient SXC architecture based on a core selective switch (CSS) is proposed (for example, see Non-Patent Document 1).

PRIOR ART DOCUMENTS

Non-Patent Documents

Non-Patent Document 1: JINNO Masahiko, et al., "Core selective switch with low insertion loss over ultra-wide wavelength range for spatial channel networks, Journal of Lightwave Technology, U.S., Mar. 15, 2022, Vol. 40, No. 6, p. 1822-p.1828

SUMMARY OF THE INVENTION

Problems to be Solved by the Invention

The proposed core selective switch employs a tilt-type MEMS mirror as a switching element. By controlling a voltage applied to the MEMS mirror, a tilt angle of the MEMS mirror is controlled. Through the control of the tilt angle, a core of a multi-core fiber as an output destination is selected.

In optical switches, including the aforementioned core selective switch, that support a multi-core fiber, the higher the core density of the multi-core fiber, the more restrictions are imposed on arrangement of reflective mirrors in a reflective mirror array.

According to one aspect of the present disclosure, it is desirable to provide an optical switch suitable for a multi-core fiber with high core density.

Means for Solving the Problems

One aspect of the present disclosure provides an optical switch. The optical switch comprises a connector, a lens, and a reflective mirror array. One or more multi-core fibers are coupled to the connector.

The lens is arranged so that input lights from the one or more multi-core fibers coupled to the connector pass through the lens. The reflective mirror array is configured to reflect each of the input lights incident through the lens toward an output destination.

Each of the one or more multi-core fibers comprises multiple cores arranged in a two-dimensional array at a specific pitch so as to form a specific geometric pattern. The lens is arranged so that the input lights that pass through the lens are incident on the reflective mirror array in a magnified geometric pattern and pitch.

The reflective mirror array comprises multiple reflective mirrors arranged in a two-dimensional array in the magnified geometric pattern and pitch. Each of the multiple reflective mirrors is configured to be able to rotate a reflection surface around two rotation axes.

According to the optical switch configured as above, the reflective mirror array can receive the input lights from the one or more multi-core fibers in the magnified geometric pattern and pitch, and reflect each of the input lights toward a corresponding output destination.

Therefore, according to one aspect of the present disclosure, an optical switch suitable for a multi-core fiber with high core density can be provided.

According to one aspect of the present disclosure, the multiple reflective mirrors may comprise multiple MEMS tilt mirrors. The MEMS tilt mirrors as switching elements have low optical loss and wide bandwidth, and can operate with low power consumption.

According to one aspect of the present disclosure, each of the multiple reflective mirrors may comprise a main body having the reflection surface on its front side, and electrode pads for power supply. The electrode pads may be provided on a rear side of the main body. According to this arrangement of the electrode pads, a wide reflection surface can be provided on the front side as compared to a case where the electrode pads are provided on the front side. Accordingly, it is possible to reduce insertion loss deriving from protrusion of the light incident on the reflective mirror from the reflection surface.

According to one aspect of the present disclosure, the reflective mirror array may comprise a substrate. The multiple reflective mirrors may be surface mounted on the substrate through the electrode pads.

According to one aspect of the present disclosure, the reflective mirror array may comprise multiple MEMS devices as the multiple reflective mirrors. Each of the multiple MEMS devices form a MEMS tilt mirror having one reflection surface.

According to one aspect of the present disclosure, the reflective mirror may comprise a first structure and a second structure. The first structure may be a structure rotated around the two rotation axes. The second structure may have a front side and a rear side, and may be coupled to the first structure on the rear side. The front side of the second structure may be a surface expanding in a direction perpendicular to a normal direction so as to overlap with the first structure in the normal direction. The reflection surface may be provided on the front side of the second structure.

According to the reflection surface being provided on the front side of the second structure that overlaps with the first structure to be rotated, a wide reflection surface can be provided on the second structure, as compared to a case where the reflection surface is provided on the front side of the first structure. Accordingly, insertion loss can be reduced.

EXPLANATION OF REFERENCE NUMERALS

1 . . . optical network, 10 . . . core selective switch, 20 . . . multi-core fiber, 21 . . . core, 30 . . . MCF array, 40 . . . micro lens array, 41 . . . micro lens, 50 . . . condenser lens, 80 . . . reflective mirror array, 81 . . . substrate, 85 . . . MEMS tilt mirror, 90 . . . controller, 100 . . . MEMS tilt mirror, 110 . . . lower structure, 111 . . . main body, 111A . . . opening portion, 111B . . . comb electrode, 113 . . . frame, 113A . . . comb electrode, 113B . . . comb electrode, 115 . . . plate, 115A . . . comb electrode, 119 . . . electrode pad, 150 . . . upper structure, 151 . . . support, 155 . . . support plate, 159 . . . reflection surface, 850 . . . main body, 851 . . . reflection surface, 859 . . . electrode pad.

MODE FOR CARRYING OUT THE INVENTION

Example embodiments of the present disclosure will be described hereinafter with reference to the accompanying drawings.

Figure 1:
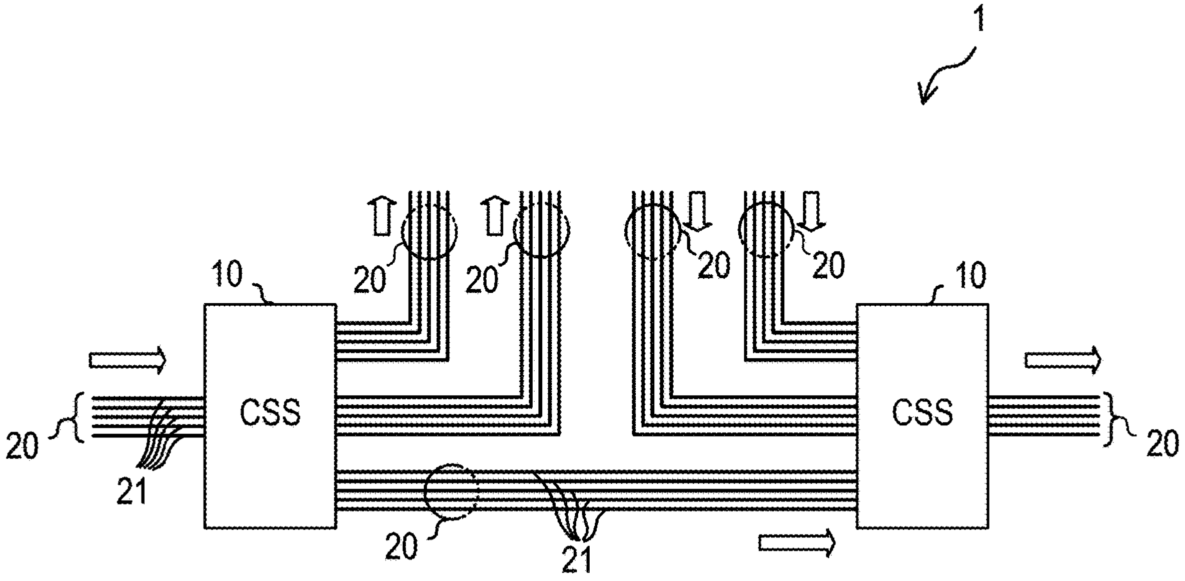
FIG. 1 is an explanatory diagram of an example installation of a core selective switch in an optical network.

A core selective switch (CSS) 10 shown in FIG. 1 of the present embodiment is an optical switch installed on a node of an optical network 1 constructed using multi-core fibers (MCF) 20.

Each of the multi-core fibers 20 is an optical fiber comprising multiple cores 21 in a clad. The core selective switch 10 is coupled to the multiple multi-core fibers 20. The core selective switch 10 is configured to be able to switch a propagation path of an optical signal on a core-by-core basis between an input MCF and an output MCF.

The input MCF corresponds to one or more multi-core fibers 20, among the multiple multi-core fibers 20, which input the optical signal to the core selective switch 10. The output MCF corresponds to one or more multi-core fibers 20, among the multiple multi-core fibers 20, which output the optical signal from the core selective switch 10 to the outside.

Figure 2:
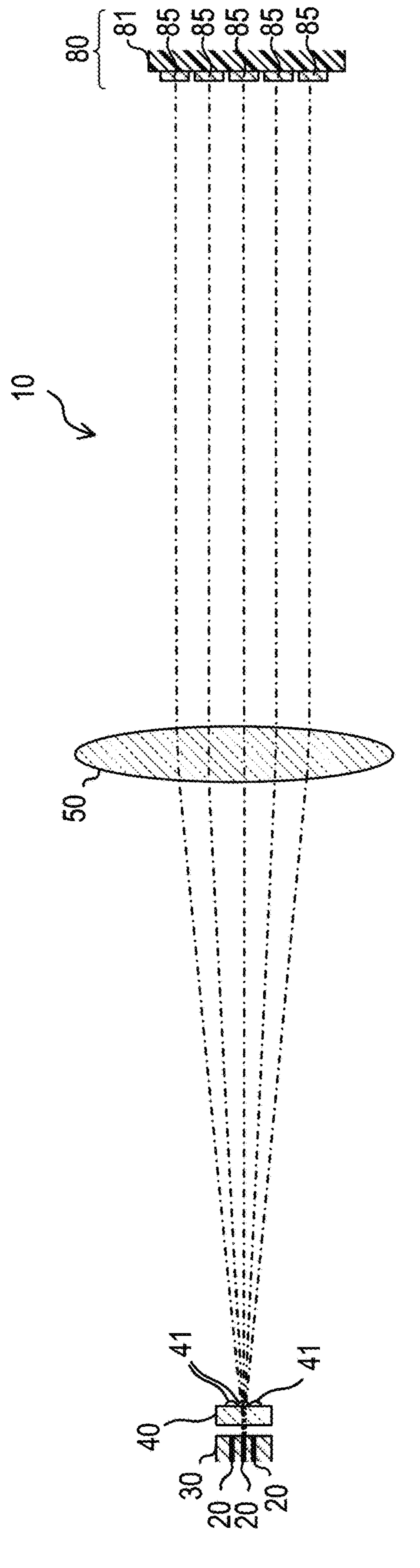
FIG. 2 is an explanatory view of an optical configuration of the core selective switch.

The core selective switch 10 shown in FIG. 2 comprises a MCF array 30, a micro lens array 40, a condenser lens 50, and a reflective mirror array 80. Dash-dotted lines in FIG. 2 conceptually illustrate input lights, that is, propagation of the optical signal input from the input MCF to the reflective mirror array 80.

Figure 3:
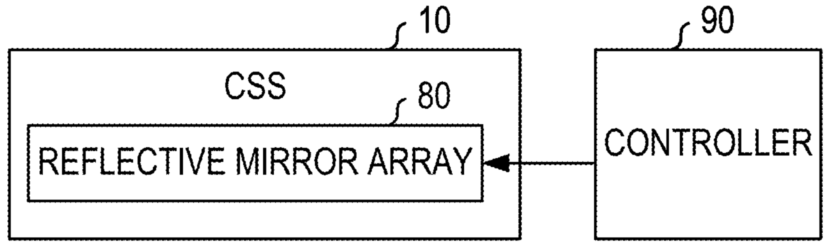
FIG. 3 is an explanatory diagram of a controller that controls the core selective switch.

As shown in FIG. 3, the controller 90 is coupled to the core selective switch 10. The controller 90 is electrically coupled to the reflective mirror array 80 so that the controller 90 can control the reflective mirror array 80.

Figure 4:
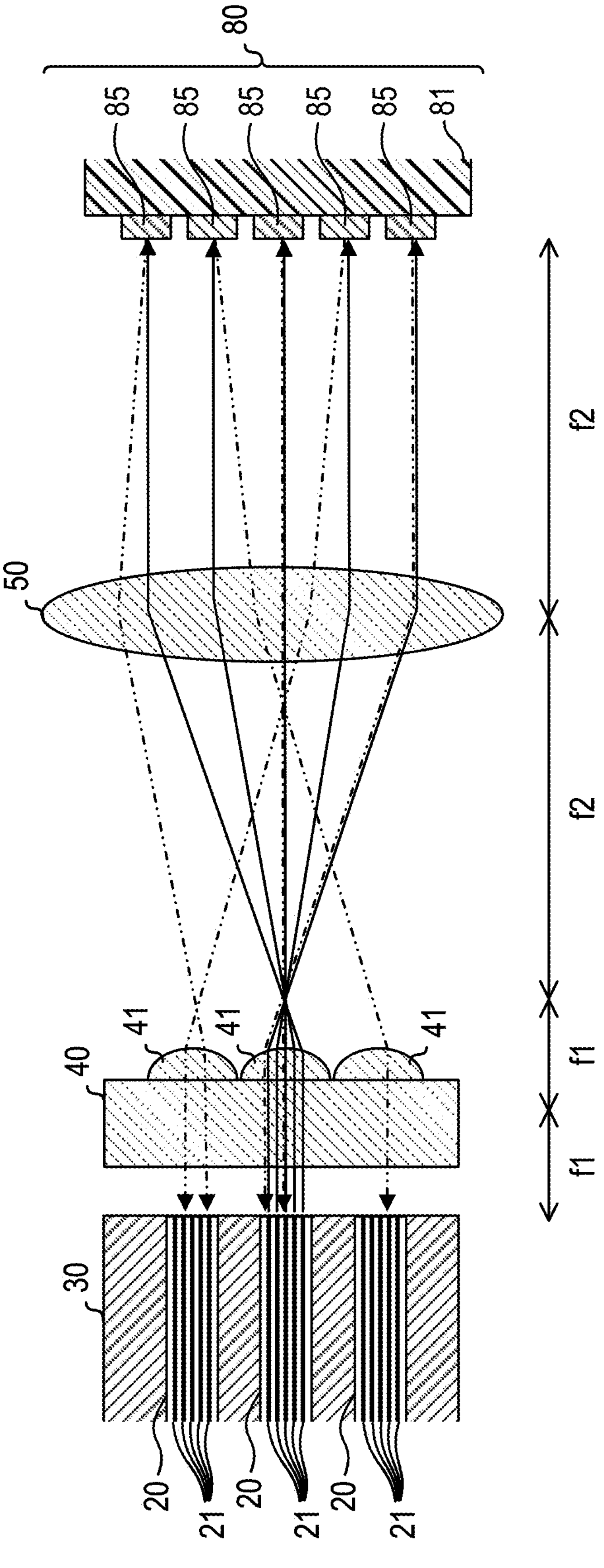
FIG. 4 is a conceptual explanatory view of optical switching in the core selective switch.

FIG. 4 conceptually explains optical switching implemented in the core selective switch 10. Solid line arrows in FIG. 4 conceptually illustrate propagation of the input lights input from the input MC. Two-dot chain line arrows in FIG. 4 conceptually illustrate propagation of reflected lights corresponding to the input lights that come from the reflective mirror array 80 and output to the outside through the output MCF.

The MCF array 30 functions as a connector with the multi-core fibers 20. At least a portion of the multiple multi-core fibers 20 coupled and fixed to the MCF array 30 function as the aforementioned input MCF. At least a portion of the multiple multi-core fibers 20 function as the aforementioned output MCF. The multiple multi-core fibers 20 may include a multi-core fiber 20 that functions as both the input MCF and the output MCF.

The micro lens array 40 comprises multiple micro lenses 41. In the micro lens array 40, the multiple micro lenses 41 are arranged in a two-dimensional array. Specifically, the multiple micro lenses 41 are arranged in the micro lens array 40 in a two-dimensional array that corresponds to the two-dimensional array of the multi-core fibers 20 coupled to the MCF array 30. Each of the micro lenses 41 functions as a collimator.

Each micro lens 41 is associated with one of the multiple multi-core fibers 20. Each micro lens 41 is arranged in a path through which the input light from the corresponding one of the multiple multi-core fibers 20 or the output light to the corresponding one of the multiple multi-core fibers 20 propagates.

The input light from each core 21 of the input MCF is converted to a collimated light by the corresponding micro lens 41, which is then incident on the condenser lens 50. A position of incidence on the condenser lens 50 differs for each core 21. In FIG. 4, the middle one of the three multi-core fibers 20 shown corresponds to the input MCF.

The optical system of the core selective switch 10 is configured as a 4f optical system that uses the micro lens array 40 and the condenser lens 50. Accordingly, the input lights from the multi-core fiber 20 are incident on the reflective mirror array 80 at a pitch and beam diameter corresponding to f2/f1 times the core pitch and core MFD (mode field diameter) in the multi-core fiber 20. Here, f1 indicates a focal length of the micro lens 41, and f2 indicates a focal length of the condenser lens 50.

The condenser lens 50 is arranged to form a telecentric optical system. The input lights from the input MCF are deflected through the condenser lens 50 so that lights that have passed through the condenser lens 50 are parallel to a principal ray (main axis) of the condenser lens 50, and condensed to be focused at a focal position of the condenser lens 50.

The reflective mirror array 80 is arranged to reflect the input lights at the focal position. The reflective mirror array 80 comprises, as MEMS-type reflective mirrors, multiple MEMS tilt mirrors 85 on a surface of the substrate 81 arranged perpendicular to the principal ray.

The multiple MEMS tilt mirrors 85 are provided on an imaging plane of the input lights from the condenser lens 50. The reflective mirror array 80 may comprise the same number of MEMS tilt mirrors 85 as the number of cores of the input MCF.

Specifically, each MEMS tilt mirror 85 is arranged at a position where the input light from the corresponding one of cores 21 that propagates through the condenser lens 50 is condensed. The multiple MEMS tilt mirrors 85 are arranged in a two-dimensional array in a magnified pattern of a two-dimensional array of the cores 21 of the input MCF.

Figure 5A:
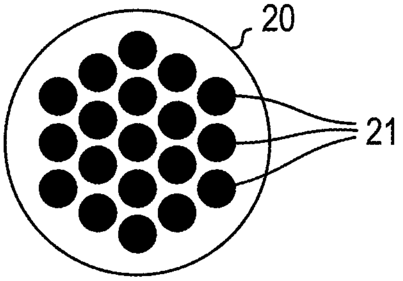
FIG. 5A is a plan view showing two-dimensional arrangement of multi-core fibers in a plane perpendicular to an optical axis.

As shown in FIG. 5A, in each multi-core fiber 20, the multiple cores 21 are arranged in a two-dimensional array at a specific pitch so as to form a specific geometric pattern in the clad. The input lights incident on the reflective mirror array 80 are incident on the reflective mirror array 80 in a magnified geometric pattern and pitch of the multiple cores 21 by passing through the micro lens array 40 and the condenser lens 50.

Figure 5B:
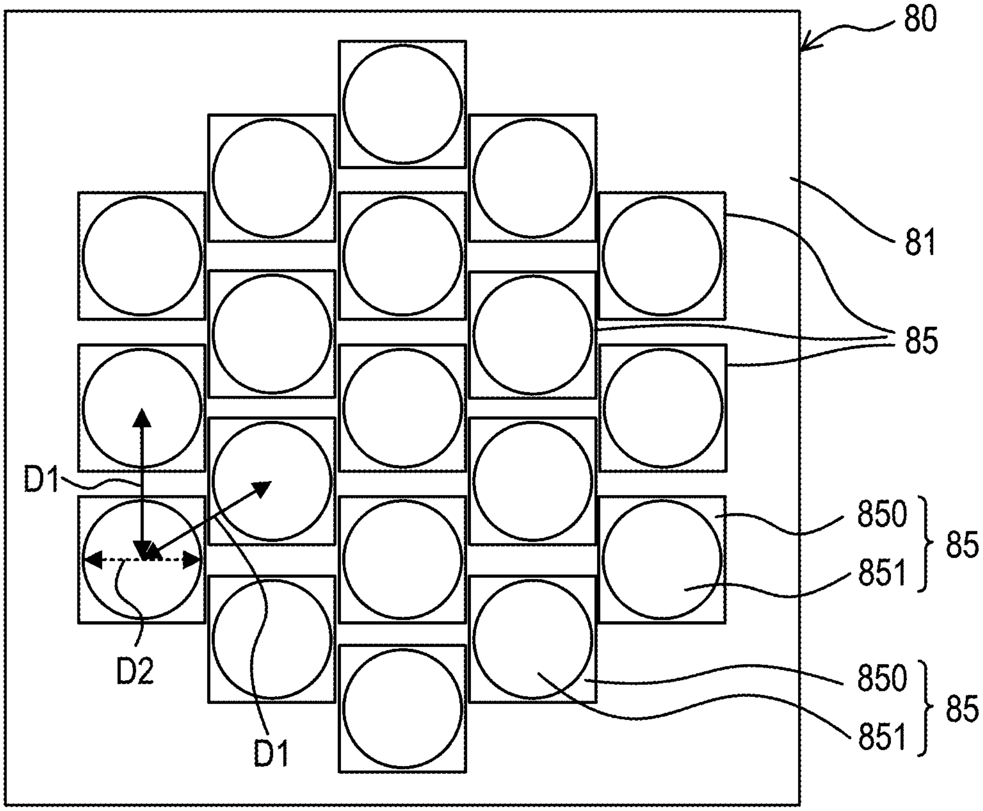
FIG. 5B is a plan view showing two-dimensional arrangement of MEMS tilt mirrors in a reflective mirror array.

In the reflective mirror array 80, the multiple MEMS tilt mirrors 85 are arranged in a two-dimensional array in the magnified geometric pattern and pitch on the substrate 81, as shown in FIG. 5B. A reference sign D1 in FIG. 5B indicates a distance between adjacent MEMS tilt mirrors 85, that is, a mirror pitch. The mirror pitch D1 is a distance between centers of reflection surfaces 851 of the adjacent MEMS tilt mirrors 85. A reference sign D2 in FIG. 5B indicates a diameter of the reflection surface 851, that is, a mirror diameter.

Figure 6A:
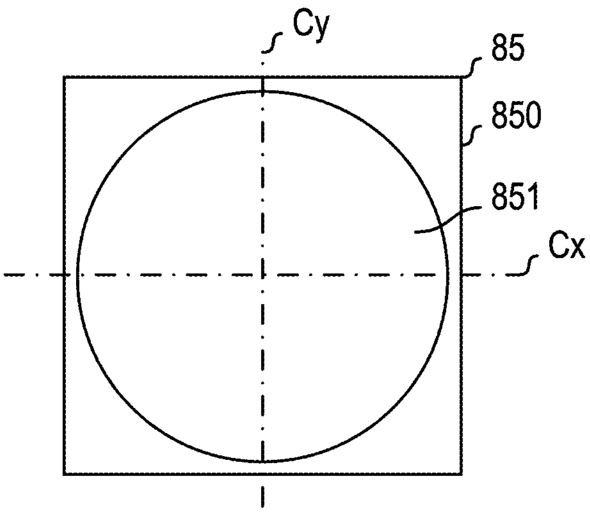
FIG. 6A is a plan view of the MEMS tilt mirror.
Figure 6B:
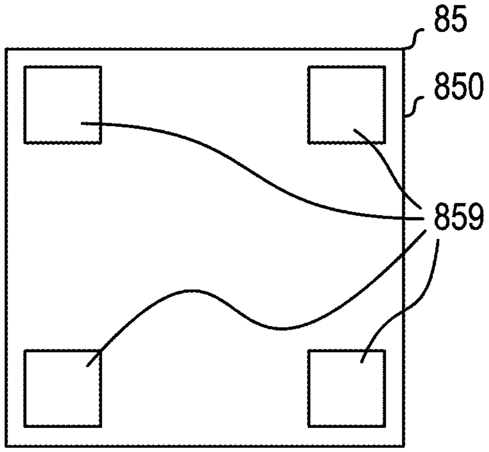
FIG. 6B is a bottom view of the MEMS tilt mirror.

FIG. 6A is a plan view of the MEMS tilt mirror 85 seen from above the reflective mirror array 80, in other words, a top view. FIG. 6B is a bottom view of the MEMS tilt mirror 85. As can be seen from FIGS. 6A and 6B, one reflection surface 851 is formed on an upper side of a main body 850 of the MEMS tilt mirror 85, and multiple electrode pads 859 for power supply are formed on a lower side of the main body 850.

Figure 7:
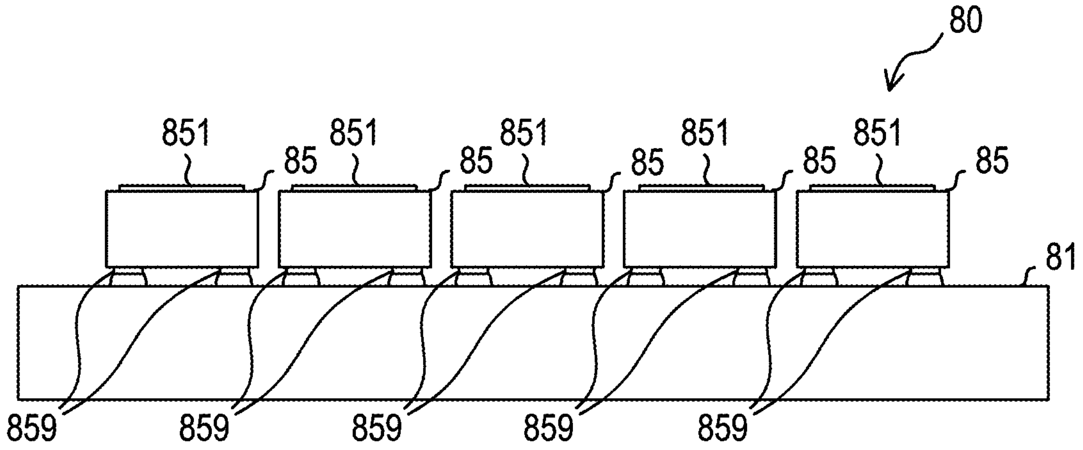
FIG. 7 is a front view of the reflective mirror array.

The MEMS tilt mirrors 85, as shown in FIG. 7, are surface mounted onto the substrate 81 by soldering in a posture where the electrode pads 859 and the substrate 81 face each other. In FIG. 7, the MEMS tilt mirrors 85 in a rear row are not shown.

The MEMS tilt mirrors 85 are configured to be able to rotate the reflection surfaces 851 around two rotation axes Cx, Cy that are parallel to the surface of the substrate 81, based on electric power supplied from the electrode pads 859 through the substrate 81. The two rotation axes Cx, Cy are orthogonal to each other.

The controller 90 is coupled to the substrate 81 so as to be able to supply the electric power to the multiple MEMS tilt mirrors 85. Each MEMS tilt mirror 85 receives the electric power supplied from the controller 90 through the electrode pad 859, and rotates the reflection surface 851.

The controller 90 is coupled to the reflective mirror array 80 so that the controller 90 can individually control a voltage applied to each of the multiple MEMS tilt mirrors 85. Rotation of the reflection surface 851 and a tilt angle of the reflection surface 851 are controlled by controlling the voltage applied by the controller 90. Hereinafter, the tilt angle of the reflection surface 851 is referred to as a tilt angle of the MEMS tilt mirror 85.

Each of the tilt angles of the multiple MEMS tilt mirrors 85 included in the reflective mirror array 80 is individually controlled by the controller 90 to a tilt angle corresponding to an output core. The output core herein is the target core 21 of the output MCF to which the reflected lights should be optically coupled. The output core corresponds to an output destination of the reflected lights.

Each MEMS tilt mirror 85 reflects the input light from the corresponding one of cores 21 at the tilt angle controlled by the controller 90. In accordance with the tilt angle, the reflected light propagates to one core 21 selected by the controller 90, that is, the aforementioned output core, among the multiple cores 21 included in the output MCF, and is output, as an output light, from the core 21 to the outside of the core selective switch 10.

In the core selective switch 10 configured as above, the input light from each core 21 of the input MCF passes through the corresponding micro lens 41 and condenser lens 50. The input light that has passed through the condenser lens 50 is incident on the corresponding MEMS tilt mirror 85.

The light that has been incident on the MEMS tilt mirror 85 is reflected on its reflection surface 851 in a direction corresponding to the tilt angle of the MEMS tilt mirror 85. The reflected light is optically coupled to the output core that is one core 21 of the output MCF selected by the controller 90 through controlling the tilt angle of the corresponding MEMS tilt mirror 85.

The reflected light is incident on the output core from the reflection surface 851 of the MEMS tilt mirror 85 through the condenser lens 50 and the corresponding micro lens 41. The light incident on the output core propagates to the outside of the core selective switch 10 through the output core.

According to the core selective switch 10 described above, the reflective mirror array 80 can receive the input lights from the multi-core fibers 20 in the magnified geometric pattern and pitch, and reflect each of the input lights toward the output core. The MEMS tilt mirror 85 as the reflective mirror in the reflective mirror array 80 has low optical loss and wide bandwidth, and can operate with low power consumption.

Furthermore, in the MEMS tilt mirror 85 of the present embodiment, the electrode pads 859 are provided on the lower side that is opposite to the upper side of the main body 850 provided with the reflection surface 851. According to this configuration, it is possible to provide the reflection surface 851 having a large area on the upper side of the main body 850, as compared to a case where the electrode pads 859 are provided on the upper side of the main body 850. Accordingly, it is possible to reduce insertion loss deriving from protrusion of the light incident on the MEMS tilt mirror 85 from the reflection surface 851.

In the core selective switch 10, insertion loss can be caused by vignetting of the input light in the reflective mirror array 80. Vignetting corresponds to protrusion of a portion of the input light from the reflection surface 851 due to the large beam diameter of the input light incident on the reflection surface 851 as compared to the diameter of the reflection surface 851 of the MEMS tilt mirror 85. The portion of the input light protruding from the reflection surface 851 causes the insertion loss.

The insertion loss caused by the vignetting varies in accordance with a ratio of the mirror diameter D2 of the MEMS tilt mirror 85 and the mirror pitch D1 which is a distance D1 between the adjacent MEMS tilt mirrors 85. The ratio of the mirror diameter D2 and the mirror pitch D1, D2/D1, is also known as a fill factor.

The smaller the fill factor, the greater the insertion loss to be caused. In order to keep the insertion loss due to vignetting below a certain percentage, the higher the core density of the multi-core fiber 20, the higher the fill factor required.

In the present embodiment, since the electrode pads 859 are provided on the lower side of the main body 850 as described above, the mirror diameter D2 of the reflection surface 851 provided on the upper side can be made large as compared to the case where the electrode pads 859 are provided on the upper side of the main body 850.

If the mirror diameter D2 can be made larger relative to the size of the main body 850, the fill factor can be improved. Therefore, according to the present embodiment, the insertion loss due to vignetting can be reduced.

Figure 8A:
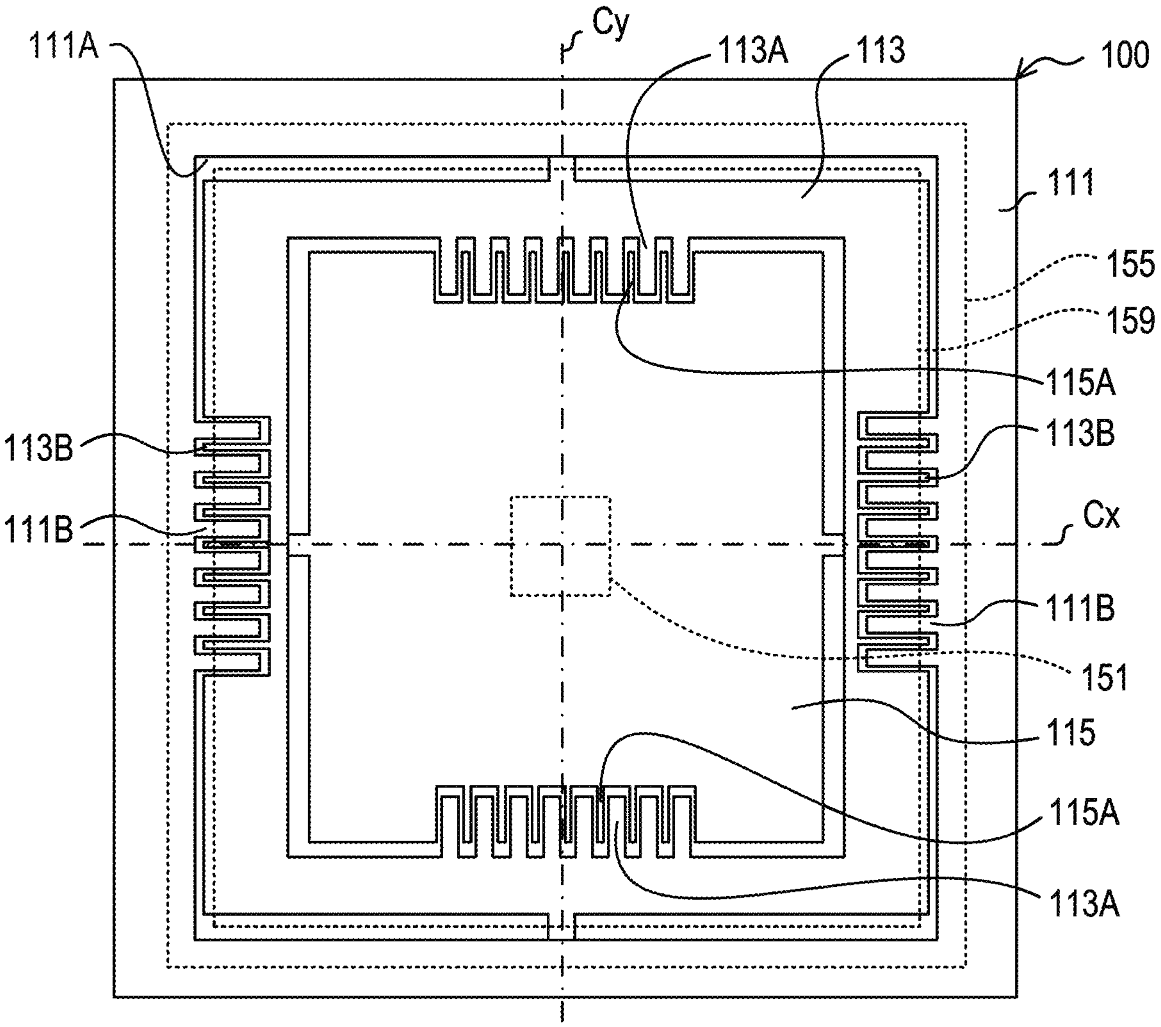
FIG. 8A is a plan view of the MEMS tilt mirror of a modified example.
Figure 8B:
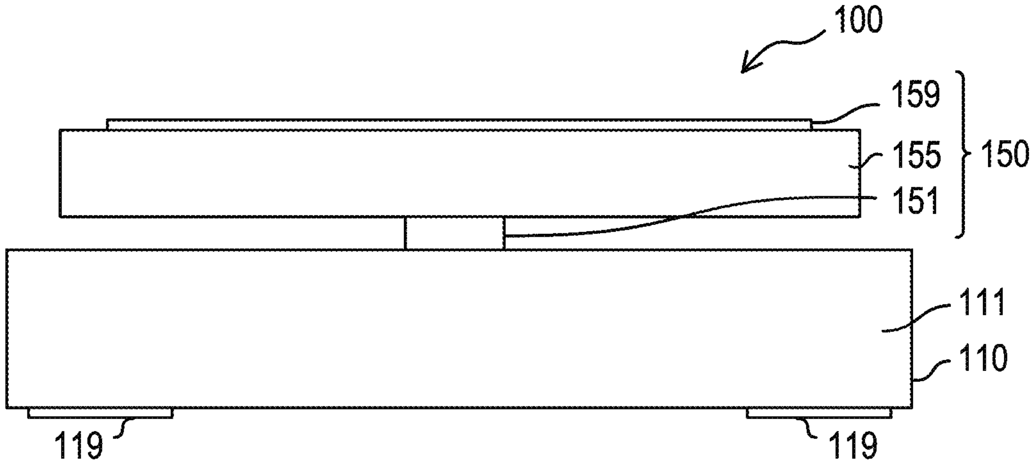
FIG. 8B is a front view of the MEMS tilt mirror of the modified example.

The aforementioned MEMS tilt mirror 85 may be replaced with a MEMS tilt mirror 100 shown in FIGS. 8A and 8B. Alternatively, the aforementioned MEMS tilt mirror 85 may be configured as the MEMS tilt mirror 100 shown in FIGS. 8A and 8B.

The MEMS tilt mirror 100 shown in FIGS. 8A and 8B comprises a lower structure 110 as a first structure and an upper structure 150 as a second structure. The lower structure 110 comprises a main body 111, a frame 113, and a plate 115. The lower structure 110 is configured to rotate the plate 115 around the two rotation axes Cx, Cy. In FIG. 8A, elements of the upper structure 150 are shown transparently. These elements are represented by broken lines in the figure.

The plate 115 has a rectangular shape, and is coupled to the frame 113 so as to be rotatable around the rotation axis Cx. The plate 115 comprises comb electrodes 115A on two sides parallel to the rotation axis Cx. The comb electrodes 115A are provided to rotate the plate 115 around the rotation axis Cx by electrostatic force.

The frame 113 has a rectangular shape, and defines an inner space that can accommodate the plate 115. The plate 115 is coupled to the frame 113 so as to be rotatable about the rotation axis Cx in the inner space. The frame 113 surrounds the plate 115 in a state coupled to the plate 115.

The frame 113 comprises comb electrodes 113A at positions facing the comb electrodes 115A provided in the plate 115, that is, on two inner sides parallel to the rotation axis Cx. The comb electrodes 113A have a shape complementary to the shape of the comb electrodes 115A provided in the plate 115.

The plate 115 is coupled to the frame 113 so that the comb electrodes 115A provided on the plate 115 and the comb electrodes 113A provided on the inner sides of the frame 113 interlock with each other with a small distance therebetween. Due to the electrostatic force generated between the comb electrodes 115A and the comb electrodes 113A, the plate 115 rotates around the rotation axis Cx relative to the frame 113.

The frame 113 comprises comb electrodes 113B on two outer sides parallel to the rotation axis C. The comb electrodes 113B are provided to rotate the frame 113 around the rotation axis Cy by electrostatic force.

The main body 111 is a bottomed rectangular box-shaped structure, and has an opening portion 111A that can accommodate the frame 113. The frame 113 is coupled to the main body 111 so as to be rotatable around the rotation axis Cy at the opening portion 111A. The main body 111, in a state coupled to the frame 113, surrounds the frame 113 such that an inner surface of the main body 111 faces an outer surface of the frame 113.

The main body 111 comprises comb electrodes 111B at positions facing the comb electrodes 113B provided on the outer sides of the frame 113, that is, on two inner sides parallel to the rotation axis Cy. The comb electrodes 111B have a shape complementary to the shape of the comb electrodes 113B provided on the frame 113.

The frame 113 is coupled to the main body 111 such that the comb electrodes 113B provided on the outer sides of the frame 113 and the comb electrodes 111B provided on the inner sides of the main body 111 interlock with each other with a small distance therebetween. Due to the electrostatic force generated between the comb electrodes 113B and the comb electrodes 111B, the frame 113 rotates around the rotation axis Cy relative to the main body 111.

Similar to the case of the MEMS tilt mirror 85, electrode pads 119 for power supply are provided on a lower side of the main body 111. Similar to the MEMS tilt mirror 85, the MEMS tilt mirror 100 of a modified example is also surface mounted on the substrate 81 of the reflective mirror array 80.

The MEMS tilt mirror 100 receives an applied voltage from the controller 90 through the substrate 81 and the electrode pads 119. The plate 115 of the MEMS tilt mirror 100 is rotated around the two rotation axes Cx, Cy through the electrostatic force caused by the applied voltage.

The upper structure 150 of the MEMS tilt mirror 100 is fixed to the plate 115 rotated as above. The upper structure 150 comprises a support 151, a support plate 155, and a reflection surface 159. As described above, the support 151, the support plate 155, and the reflection surface 159 as elements of the upper structure 150 are shown transparently in FIG. 8A.

The support 151 is fixed to the plate 115 at its lower end so as to stand in a normal direction of the plate 115. Specifically, the support 151 is vertically provided in the center of the plate 115. The support plate 155 is coupled to an upper end of the support 151 at its lower side, that is, its bottom surface, and fixed to the support 151.

The support plate 155 is arranged parallel to the plate 115 in a state spaced apart in the normal direction of the plate 115 from the plate 115 of the lower structure 110 by a height of the support 151. As a result, the support plate 155 is arranged above the lower structure 110 so as to overlap with the lower structure 110 in the normal direction, and expands in a direction perpendicular to the normal direction.

The support plate 155 specifically has a larger size than the plate 115 of the lower structure 110. The support plate 155 is arranged to cover the plate 115 of the lower structure 110 completely from above.

The surface of the support plate 155, that is, an upper surface, has a larger area than the surface of the plate 115. The reflection surface 159 is formed on this wide surface of the support plate 155. This reflection surface 159 has a larger area than the reflection surface that can be formed on the surface of the plate 115.

In other words, the MEMS tilt mirror 100 of the modified example is configured such that the support plate 155 with large area is arranged to overlap with the plate 115 of the lower structure 110, and the reflection surface 159 with large area is formed on the support plate 155.

Therefore, according to the MEMS tilt mirror 100 of the modified example, it is possible to effectively reduce the insertion loss deriving from protrusion of the input light to the reflective mirror array 80 from

Other Embodiments

The present disclosure is not limited to the aforementioned embodiment, and may take various modes. For example, the number of the multi-core fibers 20 or the number of cores thereof shown in the drawings is merely an example. The present disclosure may be applied to an optical switch comprising any number of multi-core fibers 20.

Functions of one element in the aforementioned embodiments may be achieved by two or more elements. Functions of two or more elements in the aforementioned embodiments may be achieved by one element. A part of the configuration of the aforementioned embodiments may be omitted. It should be noted that any and all forms that are encompassed in the technical ideas identified by the languages in the claims are embodiments of the present disclosure.

The invention claimed is:

1. An optical switch comprising:

a connector to which one or more multi-core fibers are coupled;

a lens arranged so that input lights from the one or more multi-core fibers coupled to the connector pass through the lens; and a reflective mirror array configured to reflect each of the input lights incident through the lens toward an output destination, each of the one or more multi-core fibers comprising multiple cores arranged in a two-dimensional array at a specific pitch so as to form a specific geometric pattern, the lens being arranged so that the input lights that pass through the lens are incident on the reflective mirror array in a magnified geometric pattern and pitch, the reflective mirror array comprising multiple reflective mirrors arranged in a two-dimensional array in the magnified geometric pattern and pitch, and each of the multiple reflective mirrors being configured to be able to rotate a reflection surface around two rotation axes.

2. The optical switch according to claim 1, wherein the multiple reflective mirrors comprise multiple MEMS tilt mirrors.

3. The optical switch according to claim 2, wherein each of the multiple reflective mirrors comprises a main body having the reflection surface on its front side, and electrode pads for power supply, the electrode pads being provided on a rear side of the main body.

4. The optical switch according to claim 3, wherein the multiple reflective mirror array comprises a substrate, and the multiple reflective mirrors are surface mounted on the substrate through the electrode pads.

5. The optical switch according to claim 4, wherein the reflective mirror comprises:

a first structure rotated around the two rotation axes, and a second structure having a front side and a rear side, the second structure being coupled to the first structure on the rear side, wherein the front side of the second structure expands in a direction perpendicular to a normal direction so as to overlap with the first structure in the normal direction, and the reflection surface is provided on the front side of the second structure.

6. The optical switch according to claim 3, wherein the reflective mirror comprises:

a first structure rotated around the two rotation axes, and a second structure having a front side and a rear side, the second structure being coupled to the first structure on the rear side, wherein the front side of the second structure expands in a direction perpendicular to a normal direction so as to overlap with the first structure in the normal direction, and the reflection surface is provided on the front side of the second structure.

7. The optical switch according to claim 2, wherein the reflective mirror comprises:

a first structure rotated around the two rotation axes, and a second structure having a front side and a rear side, the second structure being coupled to the first structure on the rear side, wherein the front side of the second structure expands in a direction perpendicular to a normal direction so as to overlap with the first structure in the normal direction, and the reflection surface is provided on the front side of the second structure.

8. The optical switch according to claim 1, wherein each of the multiple reflective mirrors comprises a main body having the reflection surface on its front side, and electrode pads for power supply, the electrode pads being provided on a rear side of the main body.

9. The optical switch according to claim 8, wherein the reflective mirror comprises:

a first structure rotated around the two rotation axes, and a second structure having a front side and a rear side, the second structure being coupled to the first structure on the rear side, wherein the front side of the second structure expands in a direction perpendicular to a normal direction so as to overlap with the first structure in the normal direction, and the reflection surface is provided on the front side of the second structure.

10. The optical switch according to claim 8, wherein the multiple reflective mirror array comprises a substrate, and the multiple reflective mirrors are surface mounted on the substrate through the electrode pads.

11. The optical switch according to claim 10, wherein the reflective mirror comprises:

a first structure rotated around the two rotation axes, and a second structure having a front side and a rear side, the second structure being coupled to the first structure on the rear side, wherein the front side of the second structure expands in a direction perpendicular to a normal direction so as to overlap with the first structure in the normal direction, and the reflection surface is provided on the front side of the second structure.

12. The optical switch according to claim 1, wherein the reflective mirror array comprises multiple MEMS devices as the multiple reflective mirrors, each of the MEMS devices forming a MEMS tilt mirror having one reflection surface.

13. The optical switch according to claim 12, wherein the reflective mirror comprises:

a first structure rotated around the two rotation axes, and a second structure having a front side and a rear side, the second structure being coupled to the first structure on the rear side, wherein the front side of the second structure expands in a direction perpendicular to a normal direction so as to overlap with the first structure in the normal direction, and the reflection surface is provided on the front side of the second structure.

14. The optical switch according to claim 1, wherein the reflective mirror comprises:

a first structure rotated around the two rotation axes, and a second structure having a front side and a rear side, the second structure being coupled to the first structure on the rear side, wherein the front side of the second structure expands in a direction perpendicular to a normal direction so as to overlap with the first structure in the normal direction, and the reflection surface is provided on the front side of the second structure.

* * * * *